United States Patent [19]

Carrillo

[11] Patent Number: 5,507,954
[45] Date of Patent: Apr. 16, 1996

[54] PROCESS FOR SEPARATING GREASE AND SOLID MATERIALS FROM A WASTE MATERIAL

[76] Inventor: Danny Carrillo, 324 SE. 67th, Oklahoma City, Okla. 73149

[21] Appl. No.: 203,262

[22] Filed: Feb. 28, 1994

[51] Int. Cl.$^6$ .................. C02F 9/00; C02F 1/24; C02F 1/40
[52] U.S. Cl. .......... 210/703; 210/712; 210/713; 210/744; 210/754; 210/767; 210/768; 210/770; 210/805; 210/806; 210/195.1; 210/197; 210/221.2
[58] Field of Search .................. 210/703, 712, 210/713, 744, 754, 767, 768, 769, 770, 771, 806, 805, 808, 109, 114, 173, 195.1, 197, 221.2, 232, 241, 244, 258, 259, 295, 298, 307, 319, 335, 339

[56] References Cited

U.S. PATENT DOCUMENTS

| | | |
|---|---|---|
| 1,505,944 | 8/1924 | Broadbridge . |
| 2,322,017 | 6/1943 | Hartman . |
| 3,167,435 | 1/1965 | Hall . |
| 3,350,301 | 10/1967 | Hoffman . |
| 3,483,981 | 12/1969 | Gordon . |
| 3,968,741 | 7/1976 | Hunt . |
| 4,026,804 | 5/1977 | Keating . |
| 4,162,972 | 7/1979 | Green . |
| 4,193,869 | 3/1980 | Brucker . |
| 4,282,256 | 8/1981 | Erich . |
| 4,519,904 | 5/1998 | Helmick . |
| 4,555,345 | 11/1985 | Yoshida . |
| 4,728,517 | 3/1988 | Markham . |
| 4,764,384 | 8/1988 | Gyann . |
| 4,790,943 | 12/1988 | Dunn . |
| 4,797,208 | 1/1989 | Miller et al. . |
| 4,828,577 | 5/1989 | Markham . |
| 4,880,652 | 11/1989 | Regutti . |
| 4,913,826 | 4/1990 | Mannig . |
| 4,913,922 | 4/1990 | Hawkes et al. . |
| 4,933,087 | 6/1990 | Markham . |
| 4,940,539 | 7/1990 | Weber . |
| 5,030,357 | 7/1991 | Lowe . |
| 5,076,937 | 12/1991 | Montgomery . |
| 5,156,745 | 10/1992 | Cairo . |
| 5,167,829 | 12/1992 | Diamond . |
| 5,173,190 | 12/1992 | Picek . |
| 5,207,921 | 5/1993 | Vincent . |
| 5,340,469 | 8/1994 | Montgomery . |
| 5,364,529 | 11/1994 | Morin . |

FOREIGN PATENT DOCUMENTS

| | | |
|---|---|---|
| 353314 | 2/1990 | European Pat. Off. . |
| 4116919 | 11/1992 | Germany . |
| 53-62353 | 6/1978 | Japan . |
| 457668 | 3/1975 | U.S.S.R. . |
| 473681 | 9/1975 | U.S.S.R. . |
| 810611 | 3/1981 | U.S.S.R. . |

*Primary Examiner*—Thomas M. Lithgow
*Attorney, Agent, or Firm*—Dunlap & Codding

[57] ABSTRACT

A process for separating grease and solid materials from a waste material so as to produce an aqueous discharge liquid. Waste material containing grease, water and solid materials is passed into a screen tank where course solid materials are separated out of the waste material. The filtrate is accumulated and injected into a series of filters wherein each filter is finer than the previous filter. The filtrate is then agitated to produce a foamed liquid which is substantially separated into a foamed oil portion and an aqueous liquid portion. The aqueous liquid portion is separated from the foamed oil portion and discharged into a sewage system. The solids captured during the filtering process are collected and in turn dried to produce a dried material which can be ground and mixed with other products and processed into animal feed, pesticides or the like.

21 Claims, 4 Drawing Sheets

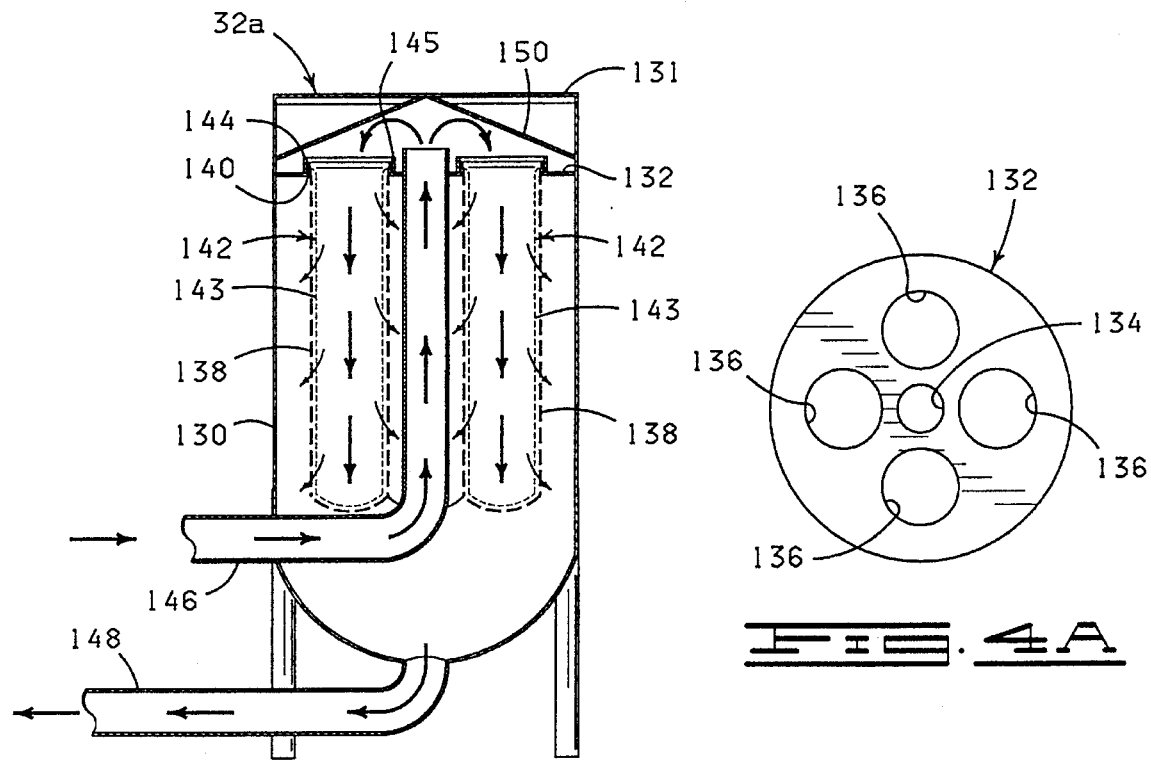
FIG. 4
FIG. 4A
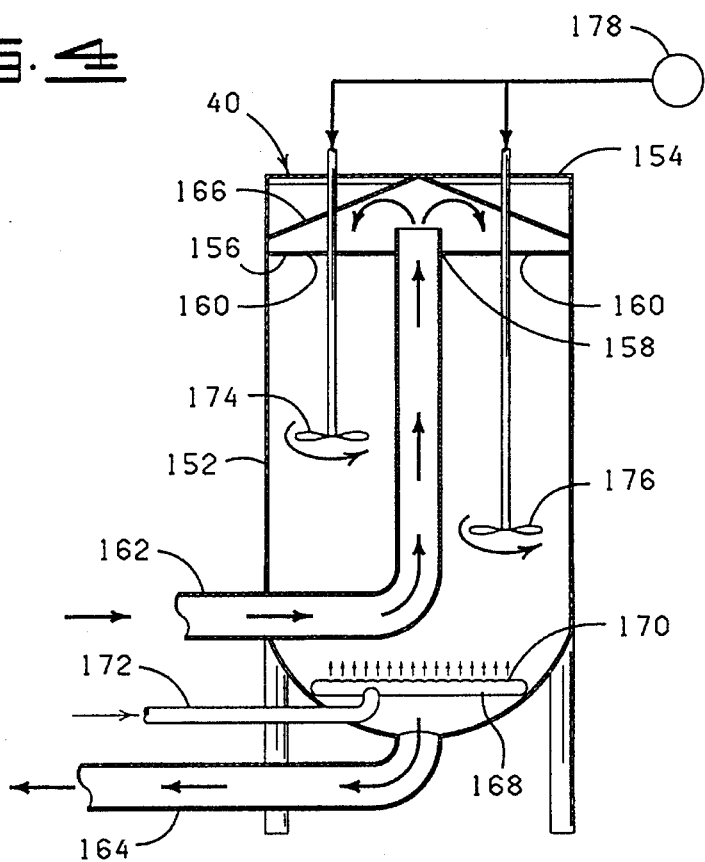
FIG. 5

PROCESS FOR SEPARATING GREASE AND SOLID MATERIALS FROM A WASTE MATERIAL

BACKGROUND OF THE INVENTION

1. Field of the Invention

The present invention relates to a process for treating waste material, and more particularly, but not by way of limitation, to an improved process for separating grease and solid materials from a waste material so as to produce an aqueous discharge liquid.

2. Description of Related Art

It is common practice for restaurants, meat and poultry processing plants, and other industries which dispose of large amounts of greasy wastes to incorporate a grease trap or separator in the waste water discharge line. Periodically, the grease trap must be emptied and cleaned so that the grease trap continues to function properly separating grease and solid materials from the waste water before such contaminants are discharged into the municipal sewage system. The waste material removed from the grease trap has typically been hauled by truck to a municipal waste treatment plant.

The overtaxing of municipal sewage treatment facilities, however, is becoming a serious problem in many communities. Therefore, stringent regulations are being put in place which require a reduction in the volume of grease and insoluble solids which may be discharged into municipal facilities. To this end, increased attention has been given to finding an improved process for separating grease and solid materials from waste material containing such residual matter and for recycling the separated solid materials for other uses. It is to such an improved process that the present invention is directed.

BRIEF DESCRIPTION OF THE DRAWINGS

FIG. 4 is a partial cutaway, elevational view of a filter used in the process of the present invention. FIG. 4A is a plan view of a plate employed in the filter of FIG. 4.

FIG. 6 is an elevational view of a separation tank used in the process of the present invention.

DETAILED DESCRIPTION

Figure 1:
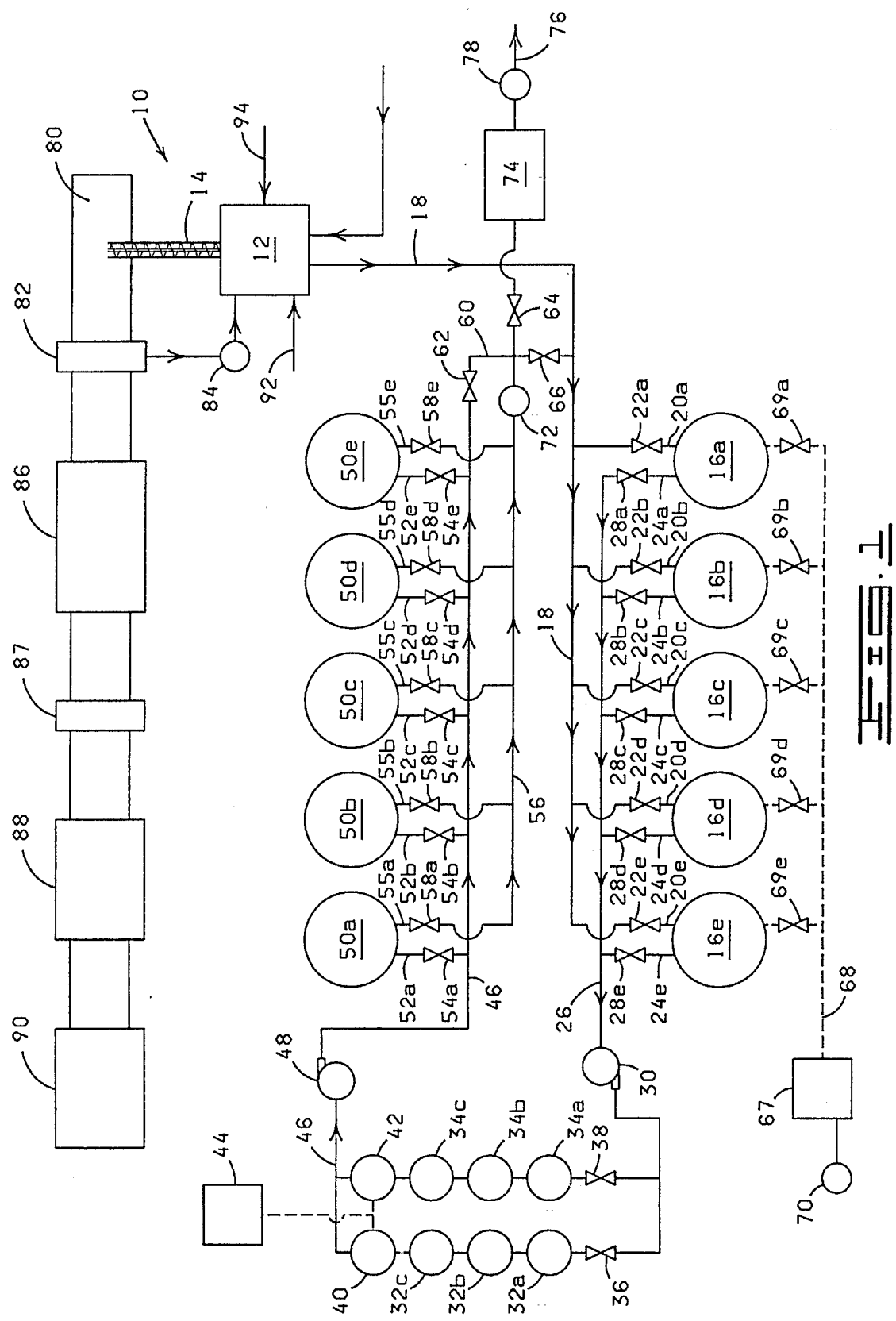
FIG. 1 is a schematic illustration of a system for separating grease and solid material from a waste material and for conditioning the separated solid materials constructed in accordance with the present invention.

Referring now to the drawings, and more particularly to FIG. 1, shown therein is a schematic illustration of the process 10 of the present invention. The process 10 provides a means to purify a waste material containing grease, water and solid materials, such as lard, bacon fat, and the like, as well as, food particles, silverware, and dish towels so that a resulting aqueous liquid can be safely discharged into a septic or sewage system. The process 10 further provides a means to condition the separated solid materials so that such conditioned material can be processed into animal feed, pesticides or the like, or disposed in a landfill.

As mentioned above, industries which dispose of large amounts of greasy wastes employ a grease trap in the waste water discharge line. Periodically, the waste material captured by the grease trap is emptied into a tanker truck which hauls the waste material away for treatment and disposal. The present invention provides a site for the safe disposal and treatment of such waste material.

When the tanker truck reaches the site of the process 10, the waste material is discharged from the tanker truck into a filter or screen tank 12. The screen tank 12 is preferably set below ground level at the process site so that the waste material can be introduced in the screen tank 12 either by gravitational force or pressure supplied by the tanker truck of about 15 psi.

The screen tank 12 functions to filter or separate out the course solid materials in the waste material, such as food particles, silverware and solidified grease. Additionally, the screen tank 12 directs the separated solid materials to an auger lift 14 which transports the solid materials separated in the screen tank 12 for further processing as will be described in detail hereinbelow.

After passing through the screen tank 12, the filtrate of the screen tank 12 passes to one of several holding tanks 16a–16e via a conduit 18. The holding tanks 16a–16e serve to accumulate a volume of the filtrate of the screen tank 12 and to store the filtrate if required during periods of maintenance or repair. It is desirable that the holding tanks 16a–16e each have a fluid capacity of at least 6000 gallons and that five holding tanks 16a–16e be employed in the process 10, as depicted in FIG. 1, thus providing for a total storage capacity of 30,000 gallons. Of course, the size and number of holding tanks 16a–16e can be varied to accommodate the specifications of downstream equipment and fluid storage requirements.

Each holding tank 16a–16e has a fluid inlet 20a–20e, respectively, connected to conduit 18 and provided with a valve 22a–22e. Thus, the filtrate of the screen tank 12 can be selectively drawn into any one of the holding tanks 16a–16e by opening an appropriate one of valves 22a–22e.

Fluid accumulated in the holding tanks 16a–16e is discharged from the holding tanks 16a–16e one at a time, in any order desirable, via fluid outlets 24a–24e, respectively, to a conduit 26 by opening a valves 28a–28e disposed in fluid outlets 24a–24e. A pump 30 is provided in conduit 26 to inject or push the fluid through a series of filters 32a, 32b, and 32c or, alternatively, a series of filters 34a, 34b and 34c. The fluid is injected through the filters by pump 30 at a pressure of approximately 100 psi to 125 psi thereby ensuring that fluid is passed through each filter while solids are effectively separated out of the fluid. It should be noted that the series of filters 32a, 32b and 32c are identical to the series of filters 34a, 34b and 34c and that the reason for the parallel series of filters is merely as a backup so as to reduce downtime. That is, when one series of filters requires cleaning or maintenance the fluid can be diverted to the other series of filters without requiring the process 10 to be interrupted by operating valves 36 and 38 accordingly.

Each subsequent filter in the series of filters 32a, 32b and 32c, or the series of filters 34a, 34b and 34c, is finer than the previous filter. For example, filter 32a may have a filter medium with a pore size of 100 microns; filter 32b may have a filter medium with a pore size of 25 microns; and filter 32c may have a filter medium with a pore size of 5 microns. As such, substantially all the suspended solid materials in the fluid are captured. In addition, clogging of the filters 32a, 32b and 32c and filters 34a, 34b and 34c is retarded due to the fact that the fluid is being pushed through the filters at a relatively high pressure.

After fluid has passed through the series of filters 32a, 32b and 32c or filters 34a, 34b and 34c, the fluid will be relatively free of insoluble materials. However, due to the molecular structure of oil or grease, it is difficult to completely separate out such substances from water by filtration alone. Thus, the filtrate emerging from the filters 32c and 34c is then forced through an oil-water separator 40 and 42, respectively.

The oil-water separators 40 and 42 function to separate the remaining grease from the aqueous liquid. Such separation is effected by agitating the fluid received in the oil-water separators 40 and 42 so as to produce a foamed liquid which is substantially separated into a foamed oil portion and an aqueous liquid portion. The fluid entering the separators 40 and 42 is agitated in part by the injection of compressed air into the bottom portion of the separators 40 and 42. The compressed air is produced by a compressor 44, and preferably, the air is injected into the separators 40 and 42 at a pressure of approximately 125 psi to 150 psi. In addition to agitating the filtrate, the injected air serves to reduce the biological chemical oxygen demand in the filtrate. The fluid in the oil-water separators 40 and 42 is further agitated by a pair of propellers as will be further described below.

The foamed liquid produced in the separators 40 or 42 is discharged via a conduit 46. A pump 48 interposed in the conduit 46 injects the foamed liquid into a selected one of a plurality of separation tanks 50a–50e. In a like manner to the holding tanks 16a–16e, each separation tank 50a–50e has a fluid inlet 52a–52e, respectively, with valves 54a–54e disposed therein. Therefore, the foamed liquid can be selectively passed to any one of separation tanks 50a–50e by opening an appropriate one of valves 54a–54e. Also in a like manner to the holding tanks 16a–16e, it is desirable that the separation tanks 50a–50e each have a fluid capacity of at least 6000 gallons and that five separation tanks 50a–50e be employed in the process 10, as depicted in FIG. 1, thus providing for a total fluid capacity of 30,000 gallons. Of course, the size and number of separation tanks 38 can be varied to accommodate the fluid storage requirements.

The aqueous liquid portion is discharged from the separation tanks 50a–50e via fluid outlets 55a–55e to a conduit 56 by opening valves 58a–58e disposed in fluid outlets 55a–55e, respectively. While discharging the aqueous liquid portion from the selected separation tank 50a–50e, the level of the foamed oil portion in the separation tanks 50a–50e, if any, is visually monitored so that the discharge of the aqueous liquid portion can be terminated by closing the appropriate valve 58a–58e prior to the commencement of the discharge of the foamed oil portion from the separation tanks 50a–50e. For example, if desired to discharge the liquid from separation tank 50a, then valve 58a is opened to allow for liquid to flow from separation tank 50a. After a substantial portion of the aqueous liquid portion is discharged and prior to the discharge of any of the foamed oil portion, valve 50a is closed.

The foamed oil portion remaining in the separation tanks 50a–50e after discharging the aqueous liquid portion is transported back to one of the holding tanks 16a–16e so that the foamed oil portion is combined with the filtrate of the screen tank 12 and injected back through the series of filters 32a, 32b and 32c or filters 34a, 34b and 34c and the oil-water separators 28 or 30. The foamed oil portion is transported back to the holding tanks 16–16e via conduit 56 and conduit 60. Valves 62, 64 and 66 are disposed in conduits 56 and 60, respectively, to selectively control the flow of fluid. Thus, by closing valves 62 and 64 and opening valve 66, the foamed oil portion can be drawn through conduits 56 and 60 and into a selected holding tank 16a–16e. It should be noted, that conduit 60 is connected to conduit 46 so that the foamed liquid discharged from the oil-water separators 40 and 42 can be directed so as to bypass the separation tanks 50a–50e and returned to the holding tanks 16a–16e, if desired.

In order to transport the foamed oil portion to the holding tanks 16a–16e from the separation tanks 50a–50e and to transport fluid from the screen tank 12 to the holding tanks 16a–16e, a vacuum is created in the holding tanks 16a–16e of 12–30 inches of vacuum which allows the selected fluid to be drawn from the separation tanks 50a–50e or the screen tank 12 and into the holding tanks 16a–16e. The vacuum is created by closing valves 22a–22e and valves 28a–28e, and actuating a vacuum pump 67 connected to each of the holding tanks 16a–16e via vacuum conduit 68. Valves 69a–69e disposed in conduit 68 are selectively opened depending in which holding tank 16a–16e a vacuum is desired. To reduce any unpleasant odors discharged by the vacuum pump 67, the vacuum pump 67 is provided with an air filter 70.

The aqueous liquid portion discharged from the separation tanks 50a–50e into conduit 56 is passed by a chlorine injection port 72 which is interposed in conduit 56. The chlorine injection port 72 permits a chlorine solution to be injected into the aqueous liquid portion in order to neutralize any bacteria in the aqueous liquid portion.

After being injected with chlorine, the aqueous liquid portion then passes through a grease trap 74 so that any oil or grease which may have been discharged from the separation tanks 50a–50e will be captured. The grease trap 74 is of conventional construction and preferably has a fluid capacity of approximately 1,000 gallons.

The aqueous liquid portion exits the grease trap 74 via a conduit 76. An inspection port 78 is provided in the conduit 76 so that the aqueous liquid portion can be periodically inspected. The inspection port 78 is intended to be used by water quality inspectors to monitor the quality of the aqueous liquid so as to ensure that the aqueous liquid meets waste water disposal standards. After passing through the inspection port 78, the aqueous liquid is discharged into the municipal sewage system.

As previously discussed, the screen tank 12 separates out a substantial portion of the solid or insoluble materials in the waste material and directs the separated solid materials to the auger lift 14. The auger lift 14 transports the collected solid materials to a conveyor belt 80. The conveyer belt 80 receives the solid materials from the auger lift 14 and transports the solid materials through a spring loaded compression device 82 which squeezes out a substantial amount of liquid contained in the solid materials. In addition to the solid materials received from the screen tank 12, it should be realized that the solid residue removed periocically from the other components of the process 10, such as the holding tanks 16a–16e and the filters 32a–32c and 34a–34c, can be transported to the conveyer belt 80 and combined with the solid materials from the screen tank 12 for further processing.

The residual liquid squeezed from the solid materials will drain into a basin (not shown) where the liquid is transported back into the screen tank 12 by a lift pump 84 or other suitable device.

To assist in drying the solid materials, an infrared light system (not shown) can be installed above the conveyor belt 80 so that the solid materials are continuously heated as the materials are traveling on the conveyor belt 80.

After the solid material passes through the compression device 82, the relatively liquid free materials pass through an oven 86 which is heated to a temperature of 105 degrees Celsius. The oven 86 dries the solid material so as to produce a dried material.

The dried material is then transported through a grinder 87 which grinds or crushes the material to a predetermined size. The material is preferably ground to a powder so that the material can be easily mixed with other ingredients to produce products, such as livestock feed and insecticides, for example. While it is believed that the greatest benefit to the environment will come from recycling the solid materials in a manner suggested above, it will be recognized that the powder material can be disposed in a landfill without significantly contributing to the growing solid waste problem.

The dried material is allowed to cool and then stored as necessary. A mixer 88 is provided for introducing a chosen ingredient or additive to the powder material and for mixing the added product with the powder mixture, and a packaging or sacking device 90 can also be provided along the conveyer belt 80 to package the resultant product and prepare it for distribution.

The process 10 described above is contemplated to be installed as permanent waste treatment facility wherein the components described herein will be set up within a fluid tight structure so that any fluids which may leak due to equipment failure or human error will be effectively contained within the structure and drained back into the process 10. To this end, it would be desirable for the process 10 to be installed in a structure having a sloped floor provided with a drain such that any fluid leaked onto the floor flows into the drain. The drain in turn would flow back into the screen tank 12 as represented by arrow 92 in FIG. 1. As represented by arrow 94, it is also contemplated to have a drain flowing into the screen tank 12 which will capture residue washed out of the tanker truckers as they pull up to the process site to discharge its load into the screen tank 12. It should also be realized that the process 10 of the present invention can be adapted so as to be mounted on a truck such that the process 10 of the present invention is portable.

Figure 2:
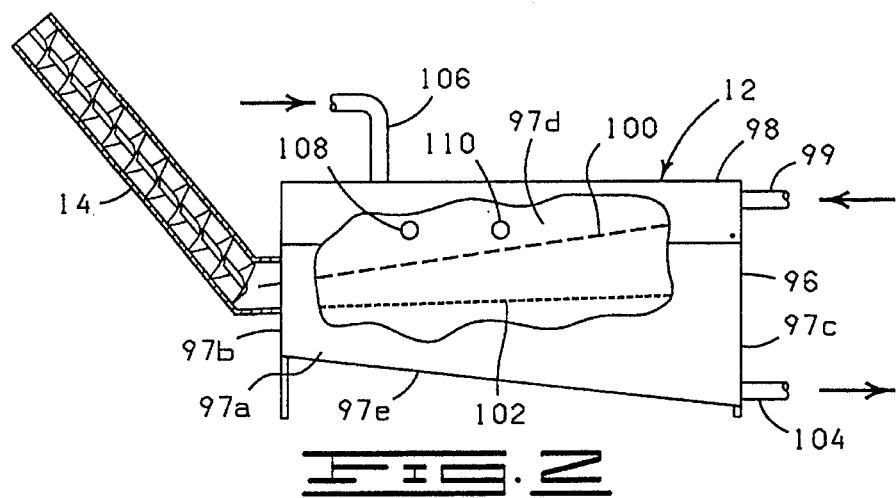
FIG. 2 is a partial cutaway, elevational view of a screen tank used in the process of the present invention.

FIG. 2 shows an elevational view of the screen tank 12 with a portion cut away to show part of the inside thereof. The screen tank 12 includes a basin portion 96 and a lid 98 pivotally attached to the basin portion 96 so that access to the interior of the screen tank 12 can be easily accomplished in order to periodically clean the interior of the screen tank 12. The basin portion 96 is characterized has having four sides 97a, 97b, 97c and 97d and a bottom 97e. When in use, the lid 98 is secured to the sides of the basin portion 96 with a suitable latching device (not shown).

A fluid inlet 99 is disposed in the lid 98 of the screen tank 12 where waste material is introduced into the screen tank 12 from a tanker truck as described above. The waste material introduced into the screen tank 12 passes through a pair of screens 100 and 102 disposed in the basin portion 96 of the screen tank 12. Screens 100 and 102 function as an initial straining device to remove the more course solid materials in the waste material as the waste material falls through the screen tank 12. Screen 100 has a larger mesh size than screen 102. For example, screen 100 may be a 10 mesh stainless steel screen, while screen 102 would then be a 12 mesh screen.

Screens 100 and 102 are angularly disposed across the basin portion 96 as substantially shown in FIG. 2 so that material captured by the screens 100 and 102 is in turn directed to the auger lift 14 which has its lower end disposed in open communication with the top of screens 100 and 120 to receive such material as it slides down each of the screens 100 and 102.

The basin portion 96 has a fluid outlet 104 disposed in the lower portion of side 97c thereof. The bottom 97e of the basin portion 96 is sufficiently sloped toward the fluid outlet 104 so that the filtrate of the screens 100 and 102 will flow out of the screen tank 12 via the fluid outlet 104.

A fluid inlet 106 is provided in the top of the screen tank 12 to receive the liquid which is lifted by the lift pump 84. Additional fluid inlets 108 and 110 may be provided in the screen tank 12 to receive fluid spilled or leaked during introduction of the waste material into the screen tank 12 or cleaned from the tanker trucks, represented by arrow 94 in FIG. 1, and leakage represented by arrow 92 in FIG. 1.

Figure 3:
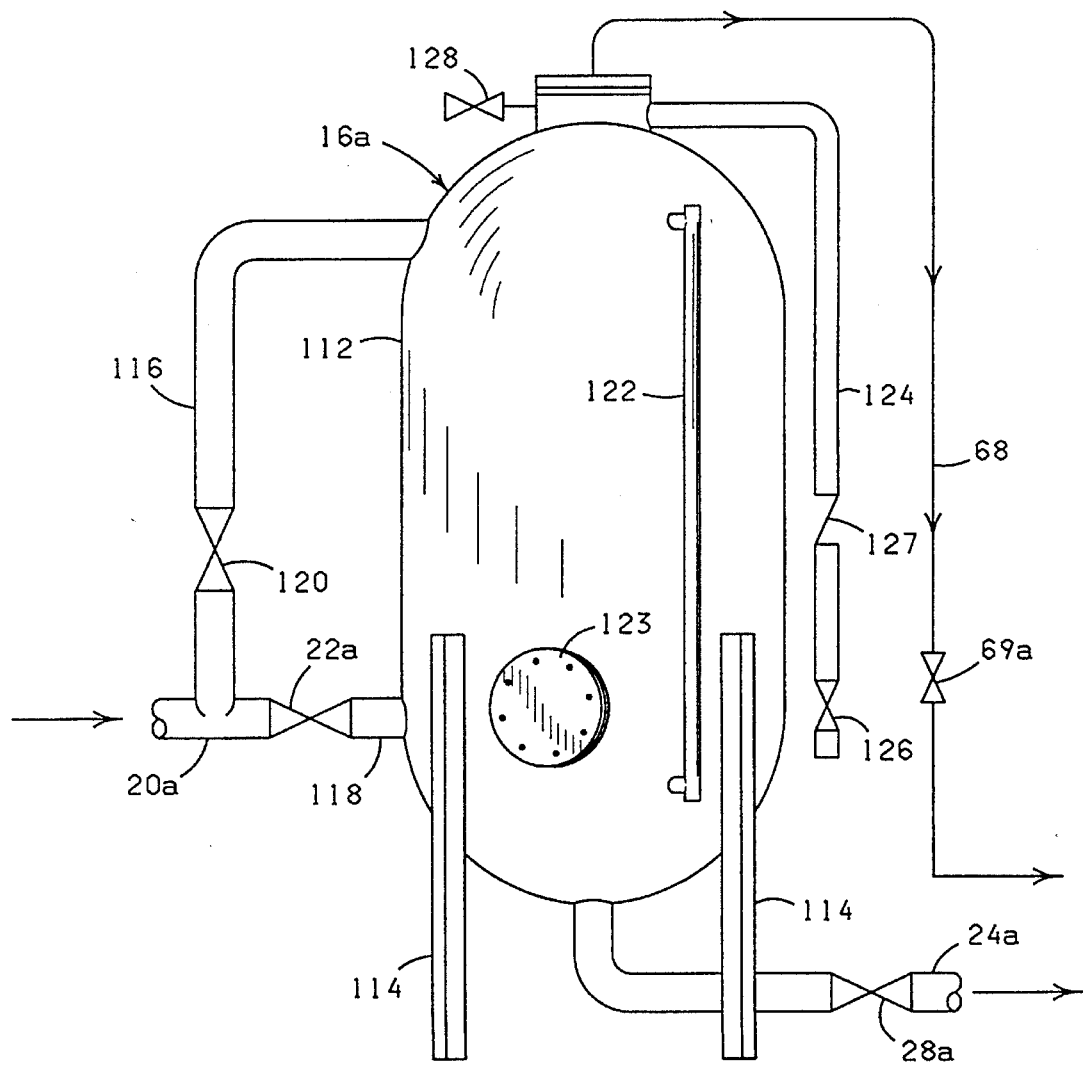
FIG. 3 is an elevational view of a storage tank used in the process of the present invention.

FIG. 3 shows an elevational view of holding tank 16a. Holding tanks 16a–16e are identical in construction, thus only holding tank 16a will be described in detail hereinafter.

Holding tank 16a comprises a substantially closed body 112 supported on a plurality of legs 114. Fluid inlet 20a and fluid outlet 24a are disposed in the body 112 substantially as shown. Fluid inlet 20a has an upper branch 116 and a lower branch 118; the upper branch 116 having a valve 120 and the lower branch 118 having a valve 22a. Fluid outlet 24a is disposed in the bottom of the closed body 112 and provided with valve 28a to control the discharge of fluid from the holding tank 16a. The holding tank 16a is provided with a sight glass 122 in order to visually monitor the volume of fluid in the storage tank 16a and a hatch 123 which permits access into the body 112 to periodically clean the interior thereof.

Vacuum conduit 68 which is in fluid communication with the vacuum pump 67 (FIG. 1) is connected to the top of the holding tank 16a to enable a vacuum to be pulled on the holding tank 16a thereby causing fluid to be drawn into the holding tank 16a as desired. An air inlet conduit 124 with a valve 126 disposed therein is provided to equalize the pressure in the holding tank 16a with ambient pressure to allow for the discharge of the fluid from the holding tank 16a. A check valve 127 is interposed in the air inlet conduit 124 to prevent fluid from escaping from the holding tank 16a through the air inlet conduit 124.

To effect a vacuum in holding tank 16a, valve 69a located in vacuum conduit 68 is opened, valves 22a, 120 and 28a are closed and the vacuum pump 67 is actuated. After the desired amount of vacuum is pulled on the holding tank 16a, the valves 22a or 120 are opened thereby causing fluid in conduit 18 to be drawn into the holding tank 16a. To discharge fluid from the holding tank 16a via the fluid outlet 24a, valve 126 is opened to allow air to enter into the holding tank 16a and equalize the pressure in the holding tank 16a. Thereafter, valve 28a is opened to allow fluid to flow from the holding tank 16a. A relief valve 128 is provided as a safety device to release excessive pressure or vacuum.

Referring now to FIG. 4, shown therein is a cross sectional view of filter 32a. Filters 32a, 32b, and 32c and filters 34a, 34b and 34c are identical in construction, except for the size of the filter medium disposed in each filter. Thus, only filter 32a will be described in detail hereinafter.

Filter 32a comprises a substantially cylindrical canister 130 and a lid 131 removably attached to the canister 130 to allow access to the interior of the canister 130. A plate 132 (best shown in FIG. 4A) having a central opening 134 and a plurality of openings 134 equally spaced about the central opening 134 is secured in the upper portion of the canister 130 as shown. The openings 136 are dimensioned to receive and support a stainless steel filter basket 138. The filter basket 138 has a lip 140 which abuts against the plate 132 to support the filter basket 138 thereon.

A filter bag 142 is inserted into each of the filter baskets 138. Each filter bag 142 comprises a porous portion 143 made from a suitable material, such as polypropylene, and has a plastic collar 144 which holds the filter bag 142 in place against a retaining ring 145 which is disposed about the lip 140 of the filter basket 138 and supported by the plate 132. A filter bag suitable for use in the filters 32a, 32b, 32c and 34a, 34b and 34c is commercially available from Parker Filtration, Lebanon, Ind. 46052-3006 and sold under the trademark FulFlo Filter Bags™.

As discussed above, the pore size of the filter bag will vary from filter to filter. That is, the first filters 32a and 34a in each series of filters will use a filter bag having a pore size which is larger than the filters bags used in the subsequent filters 32b and 32c and 34b and 34c, respectively. Similarly, filters 32b and 34b will use a filter bag having a pore size which is larger than the filter bag used in subsequent filters 32c and 34c. By way of example, the filter bag use in filter 32a may have a pore size of 100 microns, the filter bag used in filter 32b may have a pore size of 25 microns and the filter bag use in filter 32c may have a pore size of 5 microns.

The canister 130 has an inlet conduit 146 and an outlet conduit 148. The inlet conduit 146 is disposed through the side of the canister 130 and extends upward through the middle portion of the canister 130 and through the central opening 136 of the plate 132. A funnel-shaped baffle plate 150 is positioned above the inlet conduit 146 to direct the fluid discharged from the inlet conduit 146 into the filter bags 142. The fluid is pushed through the filter bags 142 and the filter baskets 138, and the filtrate is discharged from the filter 32a via the outlet conduit 148.

By directing the inlet fluid up through the middle of the canister 130 and against the funnel shaped baffle plate 150, fluid can be forced through the filters bags 142 at a pressure of 100 psi to 125 psi. This provides the advantage of allowing for an even application of fluid pressure on the filter bags 142 which in turn allows more residue to be captured by the filter bags 142 before the filter bags 142 become blocked or clogged. The relatively high fluid pressure against the filter bags 142 in essence compacts the residue captured by the filter bags 142 thereby retarding blockage or clogging.

Figure 5:
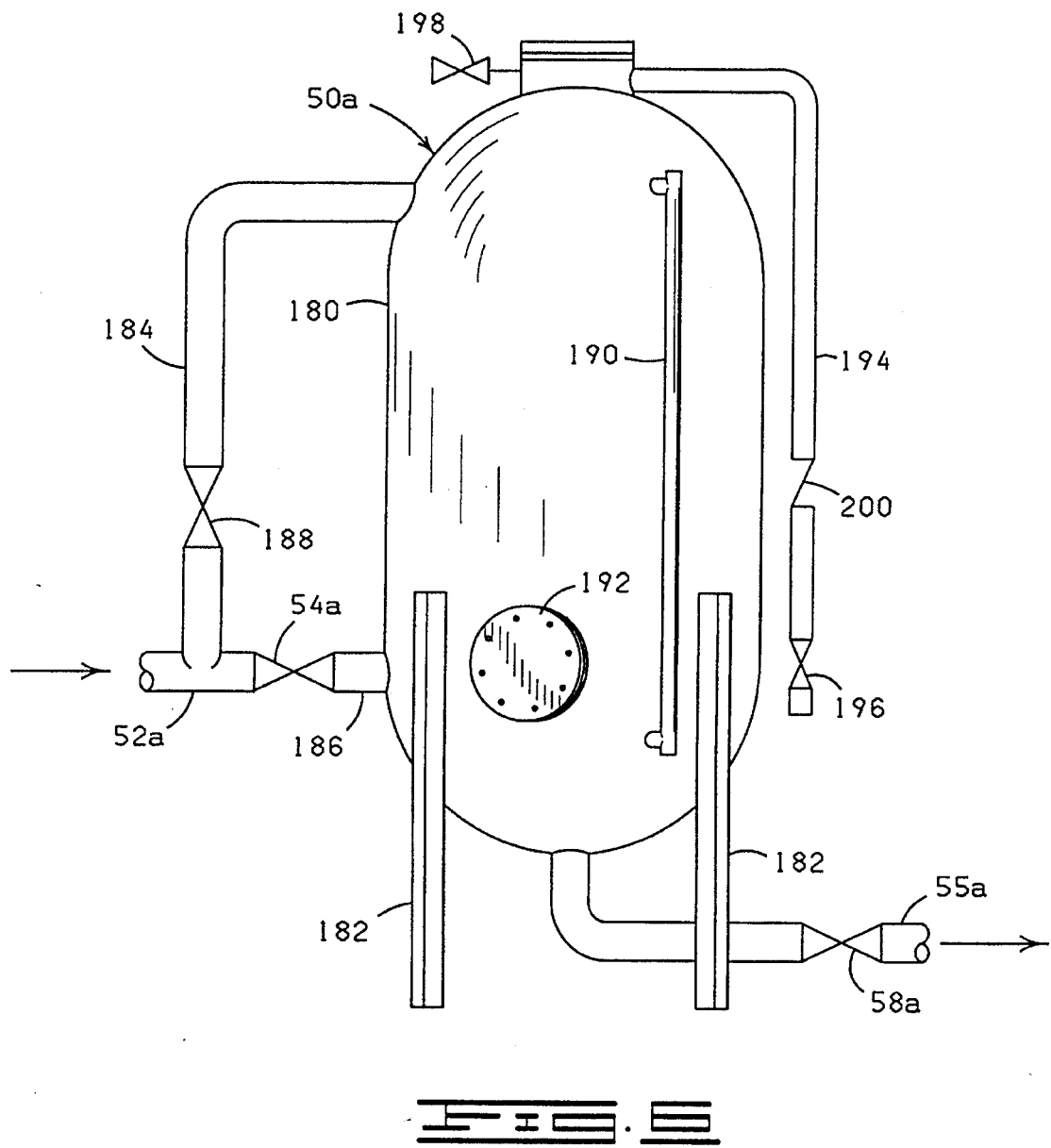
FIG. 5 is a partial cutaway, elevational view of a oil-water separator used in the process of the present invention.

FIG. 5 shows a cross sectional view of the oil-water separator 40, which is identical in construction to oil-water separator 42, thus only oil-water separator 40 will be described in detail hereinafter.

It will be realized that the construction of separator 40 is similar to the construction of filters 32a, 32b, 32c, 34a, 34b and 34c. That is, separator 40 comprises a substantially cylindrical canister 152 and a lid 154 removably attached to the canister 152 to allow access to the interior of the canister 152. A plate 156 (identical in construction to plate 132 illustrated in FIG. 4A) having a central opening 158 and a plurality of openings 160 equally spaced about the central opening 158 is secured in the upper portion of the canister 152 as shown.

The canister 152 has an inlet conduit 162 and an outlet conduit 164. The inlet conduit 162 is disposed through the side of the canister 152 and extends upward through the middle portion of the canister 152 and through the central opening 158 of the plate 156. A funnel-shaped baffle plate 166 is positioned above the inlet conduit 162 to direct the fluid discharged from the inlet conduit 162 down through the openings 160.

Fluid accumulated in the canister 152 is agitated to separate any grease which may not have been separated out by filters 32a, 32b, and 32c or 34a, 34b and 34c. Such agitation is effected in part by the injection of air at a selected pressure into the canister 152 via an air manifold 168 positioned in the lower portion of the canister 152 and provided with a plurality of air outlet ports 170. The air manifold 168 is connected to a pressurized air source, such as compressor 44 (FIG. 1), via conduit 172. In addition to agitating the fluid in the separator 40, the air injected through the air manifold 168 also serves to reduce the biological chemical oxygen demand in the fluid.

The fluid in the separator 40 is further agitated with a plurality of propellers 174 and 176 positioned in the canister 152 such that the propellers 174 and 172 are staggered. The propellers 174 and 176 are rotated by an electric motor 178.

The combination of the injection of air into the canister 152 and the rotation of the propellers 174 and 176 at different depths in the canister 152 causes the fluid injected into the separator 40 to become extremely agitated so that any oil present in the fluid is effectively separated from the aqueous liquid in the separator 40. The fluid in the separator 40 is characterized has being formed into a foamed liquid which is separated into a foamed oil portion and an aqueous liquid portion. The foamed liquid is discharged to conduit 46 via fluid outlet 164.

FIG. 6 shows an elevational view of separation tank 50a. Separation tanks 50a–50e are identical in construction, thus only separation tank 50a will described in detail hereinafter.

Separation tank 50a comprises a substantially closed body 180 supported on a plurality of legs 182. Fluid inlet 52a and fluid outlet 55a are disposed in the body 180 substantially as shown. Fluid inlet 52a has an upper branch 184 and a lower branch 186; the upper branch 186 having a valve 188 and the lower branch 186 having valve 54a. Fluid outlet 55a is disposed in the bottom of the closed body 180 and provided with valve 58a to control the discharge of fluid from the separation tank 50a. The separation tank 50a is provided with a sight glass 190 in order to visually monitor the volume of fluid in the storage tank 16a. The separation, tank 50a is further provided with a hatch 192 which permits access into the body 180 to periodically clean the interior thereof.

An air inlet conduit 194 with a valve 196 disposed therein is provided to equalize the pressure in the separation tank 50a with ambient pressure to allow for the discharge of the fluid from the separation tank 50a. A relief valve 198 is provided as a safety device to release excessive pressure or vacuum, and a check valve 200 is interposed in the air inlet conduit 194 to prevent fluid from escaping from the separation tank 50a via the air inlet conduit 194.

From the above description it is clear that the present invention is well adapted to carry out the objects and to attain the advantages mentioned herein as well as those inherent in the invention. While a presently preferred embodiment of the invention have been described for purposes of this disclosure, it will be understood that numerous changes may be made which will readily suggest themselves to those skilled in the art and which are accomplished within the spirit of the invention disclosed and as defined in the appended claims.

What is claimed:

1. A process for producing an aqueous discharge liquid from a waste material containing grease, solid materials and water, the process comprising the steps of:
    passing the waste material through a filter to separate out a substantial portion of the solid materials in the waste material;
    agitating the filtrate of the filter to produce a foamed liquid which is substantially separated into a foamed oil portion and an aqueous liquid portion, the agitating comprising the steps of: injecting air into the filtrate of the filter; and actuating a propeller disposed in the filtrate;
    passing the foamed liquid into a separation tank;
    discharging the aqueous liquid portion from the separation tank;
    monitoring the level of the foamed oil portion while discharging the aqueous liquid portion; and
    terminating the passage of the aqueous liquid portion prior to the commencement of the discharge of the foamed oil portion.

2. The process of claim 1 further comprising the step of:
    injecting chloride into the aqueous liquid portion after discharging the aqueous liquid portion from the separation tank to neutralize bacteria in the aqueous liquid portion.

3. The process of claim 2 further comprising the step of: passing the aqueous liquid portion through a grease trap to separate out substantially all remaining oil from the aqueous liquid portion.

4. The process of claim 3 further comprising the step of: inspecting the aqueous liquid portion to ensure that the aqueous liquid portion is of a predetermined quality.

5. A process for producing an aqueous discharge liquid from a waste material containing grease, solid materials and water, the process comprising the steps of:
    passing the waste material through a first filter to separate out a first portion of the solid materials from the waste material;
    accumulating a volume of the filtrate from the first filter;
    injecting the filtrate through a series of filters at a pressure of at least 100 psi, each subsequent filter in the series of filters being finer than the previous filter;
    agitating the filtrate of the finest filter to produce a foamed liquid which is substantially separated into a foamed oil portion and an aqueous liquid portion;
    passing the foamed liquid into a separation tank;
    discharging the aqueous liquid portion from the separation tank;
    monitoring the level of the foamed oil portion while discharging the aqueous liquid portion; and
    terminating the passage of the aqueous liquid portion prior to the commencement of the discharge of the foamed oil portion.

6. The process of claim 5 wherein the agitating step comprises the steps of:
    injecting air into the filtrate of the finest filter; and
    actuating a propeller disposed in the filtrate.

7. The process of claim 6 further comprising the step of:
    injecting chloride into the aqueous liquid portion after discharging the aqueous liquid portion from the separation tank to neutralize bacteria in the aqueous liquid portion.

8. The process of claim 6 further comprising the step of:
    passing the aqueous liquid portion through a grease trap to separate out substantially all remaining oil from the aqueous liquid portion.

9. The process of claim 8 further comprising the step of:
    inspecting the aqueous liquid portion to ensure that the aqueous liquid portion is of a predetermined quality.

10. The process of claim 5, following the step of terminating the passage of the aqueous liquid portion from the separation tank, the process further comprising the steps of:
    drawing the foamed oil portion from the separation tank;
    combining the foamed oil portion with the filtrate of the first filter; and
    injecting the filtrate and the foamed oil portion through the series of filters at a pressure of at least 100 psi.

11. The process of claim 5 further comprising the step of:
    collecting the separated solid materials;
    drying the collected solid materials at a temperature of approximately 105 degrees Celsius to produce a dried material; and
    grinding the dried material to a predetermined size.

12. The process of claim 11 further comprising the steps of:
    compressing the collected solid materials so as to remove a substantial amount of the liquid contained in the solid materials;
    collecting the removed liquid; and
    passing the collected liquid through the first filter.

13. The process of claim 11, further comprising the step of: packaging the ground material.

14. A process for producing an aqueous discharge liquid from a waste material containing grease, solid materials and water, the process comprising the steps of:
    passing the waste material through a filter to separate out a substantial portion of the solid materials in the waste material, the step of passing the waste material through a filter comprising the steps of:
        passing the waste material through a first filter to separate out a first portion of the solid materials from the waste material; and
        passing the filtrate of the first filter through a second filter to separate out a second portion of the solid materials from the waste material, the second filter being finer than the first filter;
    accumulating a volume of the filtrate of the second filter;
    injecting accumulated filtrate through a series of filters at a pressure of at least 100 psi, each subsequent filter in the series of filters being finer than the previous filter;
    agitating the filtrate of the finest filter to produce a foamed liquid which is substantially separated into a foamed oil portion and an aqueous liquid portion in a separation tank; and
    discharging the aqueous liquid portion.

15. The process of claim 14, following the step of terminating the passage of the aqueous liquid portion from the separation tank, the process further comprising the steps of:
    drawing the foamed oil portion from the separation tank;
    combining the foamed oil portion with the filtrate of the second filter; and
    injecting the filtrate of the second filter and the foamed oil portion through the series of filters at a pressure of least 100 psi.

16. A process for separating grease and solid materials from a waste material containing grease, solid materials and water, and for conditioning the separated solid materials, a process comprising the steps of:

passing the waste material through a filter to separate out a substantial portion of the solid materials in the waste material;

agitating the filtrate of the filter to produce a foamed liquid which is substantially separated into a foamed oil portion and an aqueous liquid portion, the agitating step comprising the steps of: injecting air into the filtrate of the filter; and actuating a propeller disposed in the filtrate;

passing the foamed liquid into a separation tank;

discharging the aqueous liquid portion from the separation tank;

monitoring the level of the foamed oil portion while discharging the aqueous liquid portion;

terminating the passage of the aqueous liquid portion prior to the commencement of the discharge of the foamed oil portion; and conditioning the separated solid materials, the conditioning step comprising the steps of:
    collecting the separated solid materials;
    drying the solid materials to produce a dried material; and
    grinding the dried materials to a predetermined size.

17. The process of claim 16 further comprising the step of:

injecting chloride into the aqueous liquid portion after discharging the aqueous liquid portion from the separation tank to neutralize bacteria in the aqueous liquid portion.

18. The process of claim 17 further comprising the step of:

passing the aqueous liquid portion through a grease trap to separate out substantially all remaining oil from the aqueous liquid portion.

19. The process of claim 18 further comprising the step of:

inspecting the aqueous liquid portion to ensure that the aqueous liquid portion is of a predetermined quality.

20. A process for separating grease and solid materials from a waste material containing grease, solid materials and water, and for conditioning the separated solid materials, the process comprising the steps of:

passing the waste material through a filter to separate out a substantial portion of the solid materials in the waste material, the step of passing the waste material through a filter comprising the steps of:

passing the waste material through a first filter to separate out a first portion of the solid materials from the waste material; and passing the filtrate of the first filter through a second filter to separate out a second portion of the solid material from the waste material, the second filter being finer than the first filter;

accumulating a volume of filtrate of the second filter;

injecting the filtrate of the second filter through a third filter at a pressure of at least 100 psi to separate out a third portion of the solid materials from the waste material, the third filter being finer than the second filter;

passing the filtrate of the third filter through a fourth filter to separate out a fourth portion of the solid materials from the waste material, the fourth filter being finer than the third filter;

passing the filtrate of the fourth filter through a fifth filter to separate out a fifth portion of the solid materials from the waste material, the fifth filter being finer than the fourth filter;

agitating the filtrate of the finest filter to produce a foamed liquid which is substantially separated into a foamed oil portion and an aqueous liquid portion;

discharging the aqueous liquid portion; and conditioning the separated solid materials, the conditioning step comprising the steps of:
    collecting the separated solid materials;
    drying the solid materials to produce a dried material; and
    grinding the dried material to a predetermined size.

21. The process of claim 20, following the step of terminating the passage of the aqueous liquid portion from the separation tank, the process further comprising the steps of:

drawing the foamed oil portion from the separation tank;

combining the foamed oil portion with the filtrate of the second filter; and injecting the filtrate of the second filter and the foamed oil portion through the third, fourth, and fifth filters at a pressure of at least 100 psi.

* * * * *